United States Patent
Sabatino et al.

(10) Patent No.: US 10,117,083 B1
(45) Date of Patent: Oct. 30, 2018

(54) METHOD AND APPARATUS FOR AUDIO PRIORITIZATION

(71) Applicant: MOTOROLA SOLUTIONS, INC, Chicago, IL (US)

(72) Inventors: John M De Sabatino, Sunrise, FL (US); Ritesh Desai, Algonquin, IL (US); Stephen C. Glass, Plantation, FL (US); Sean Regan, Deerfield Beach, FL (US); Mark Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/582,184

(22) Filed: Apr. 28, 2017

(51) Int. Cl.
*H04W 4/90* (2018.01)
*H04W 4/10* (2009.01)
*H04M 3/436* (2006.01)
*H04W 72/10* (2009.01)
*H04M 1/02* (2006.01)

(52) U.S. Cl.
CPC ........... *H04W 4/90* (2018.02); *H04M 3/4365* (2013.01); *H04W 4/10* (2013.01); *H04W 72/10* (2013.01); *H04M 1/0202* (2013.01)

(58) Field of Classification Search
CPC ......... H04W 4/90; H04W 72/10; H04W 4/10; H04M 3/4365; H04M 1/0202
See application file for complete search history.

(56) References Cited

U.S. PATENT DOCUMENTS

| | | | |
|---|---|---|---|
| 7,721,032 B2 | 5/2010 | Bushell et al. | |
| 8,111,837 B2 | 2/2012 | Guetta et al. | |
| 8,498,723 B2 | 7/2013 | Sampat et al. | |
| 8,694,140 B2 | 4/2014 | Batson | |
| 8,990,534 B2 | 3/2015 | Desai et al. | |
| 9,060,196 B2 | 6/2015 | Torr et al. | |
| 9,332,010 B2 | 5/2016 | Abbate et al. | |
| 9,471,378 B2 | 10/2016 | Desai et al. | |
| 9,523,585 B2 | 12/2016 | Thirumale | |
| 2003/0002481 A1* | 1/2003 | Laursen | H04L 29/06027 370/352 |
| 2008/0037753 A1 | 2/2008 | Hofmann | |
| 2008/0310305 A1 | 12/2008 | Lee | |
| 2011/0289506 A1* | 11/2011 | Trivi | G06F 9/526 718/104 |
| 2014/0222178 A1 | 8/2014 | Batson et al. | |
| 2014/0274080 A1* | 9/2014 | Gilbert | H04W 76/18 455/450 |
| 2014/0277645 A1* | 9/2014 | Thirumale | G01C 21/3629 700/94 |
| 2017/0347307 A1* | 11/2017 | Mehta | H04L 12/4633 |

* cited by examiner

*Primary Examiner* — Dong-Chang Shiue
(74) *Attorney, Agent, or Firm* — Barbara R. Doutre

(57) ABSTRACT

A method and apparatus providing improved audio prioritization is provided. A public safety (PS) application programming interface (API) for an open source operating system provides a public safety extension to an audio management platform by providing configurable and updatable audio priority operation based on call type, call mode, and/or call characteristics.

12 Claims, 5 Drawing Sheets

METHOD AND APPARATUS FOR AUDIO PRIORITIZATION

FIELD OF THE INVENTION

The present invention relates generally to communication devices and more particularly to a method and apparatus for audio prioritization in a communication device.

BACKGROUND

In the past and even in many of today's communication environments, land mobile radios (LMR) have operated over a narrowband network for use in public safety environments, such as law enforcement, fire rescue, and the like, while smartphone devices have operated over broadband networks for other business or consumer oriented applications. However, the power of broadband is reshaping public safety. With appropriate software applications and platforms some communication devices now offer group communication functionality carried out over a broadband network. In situations where different organizations may need to interoperate with each other, the larger availability of broadband frequencies and devices, along with the applications supported by broadband, such as telephony, text, and video, imaging and multimedia applications, makes LMR over broadband an attractive approach to communication. However, the integration of LMR functionality over a broadband network has come with certain challenges. For example, the ability to appropriately optimize such communication devices to prioritize public safety functions has heretofore been limited to the Emergency function. Other public safety functions, such as public safety push-to-talk (PTT) audio and other audio applications related to public safety, have been facing challenges due to the fact that certain operating systems prioritize telephony calls, over incoming public safety calls. There is a need, particularly for those users operating in public safety environments, to have quick access to a public safety call. However, any attempts to change priority must take care not to impact the operating system and/or third party applications which cannot be modified.

Accordingly, it would be desirable to prioritize communications services for first responders operating in a broadband network, such as LMR, within the bounds of an open source operating system and without impacting third party applications or interfaces. The ability to configure audio prioritization would also be extremely advantageous as certain customers have different priority needs. An approach that creates a seamless communications experience across LMR and broadband networks and devices is thus highly desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
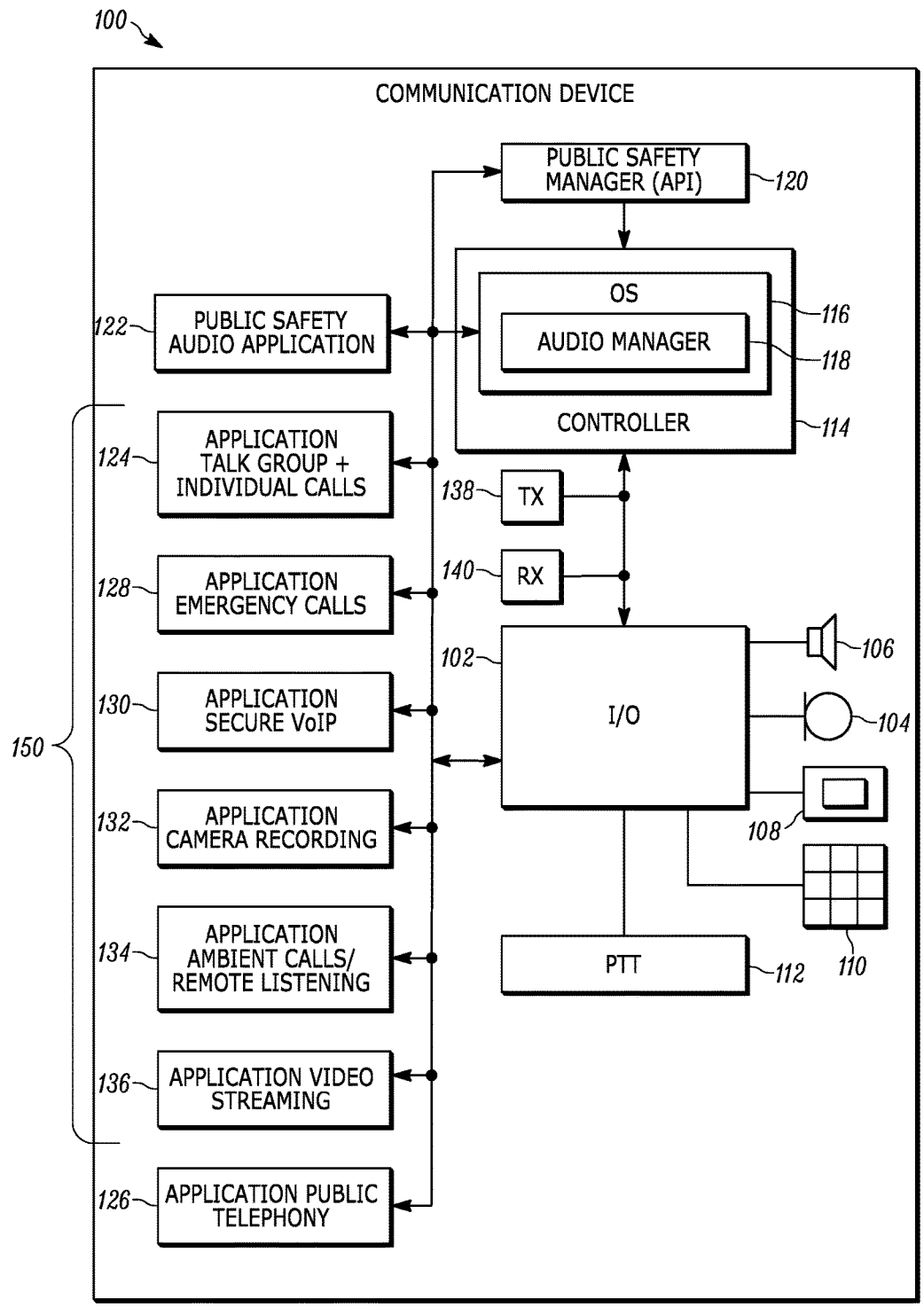
FIG. 1 is a block diagram for a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a method and apparatus for audio prioritization for a device incorporating land mobile radio (LMR) functionality over broadband operation. The audio being prioritized within the embodiments described herein is application audio. The embodiments provide for an operating platform's audio manager to provide audio focus based on application audio priority. An application extension to the operating system audio platform provides prioritization of audio requests, allowing third party applications to use audio resources directly. All prioritized audio application requests are queued and are resumed based on application audio priority. For the purposes of this application, land mobile radio also called public land mobile radio or private land mobile radio, is a wireless communications system intended for use by terrestrial users in vehicles (mobiles) and/or on foot (portables). Examples are two way radios in vehicles. Such systems are used by emergency first responder organizations such as police, fire, and ambulance services, public works organizations, dispatched services such as taxis, or companies with large vehicle fleets or numerous field staff. For the purposes of this application, the LMR system is connected to other fixed systems such as the public switched telephone network (PSTN) or cellular networks.

FIG. 1 is a block diagram of a communication device 100 formed and operating in accordance with some embodiments. Communication device 100 is a mobile device comprising input and output (I/O) ports 102 operatively interfaced to a plurality of user interface features, such as a microphone 104, a speaker 106, a display 108, a virtual keypad 110, and a push-to-talk (PTT) button 112 to name a few. The I/O ports 102 are managed via a controller 114, the controller being further configured to operate with a broadband operating system (OS) 116, the OS 116 being directly interoperable with a plurality of audio applications 150. The operating system 116 may be a mobile operating system designed primarily for mobile devices such as smartphones and tablets and may comprise for example, an Android™ operating system developed by GOOGLE, Inc., or other operating systems known or yet to be developed for broadband mobile type devices. The broadband mobile type devices operate over broadband networks may comprise one or more or long term evolution (LTE) networks, 3G, 4G, 5G, Wi-Fi and others known or yet to be developed. In accordance with the embodiments, a broadband public safety audio application 122 may comprise one or more of a plurality of public safety audio or audio related applications 150 for operation in a public safety environment. In accordance with some embodiments, broadband public safety application 122 may be a public safety PTT audio application. In accordance with some embodiments, broadband public safety audio application 122 can enable, for example, Land Mobile Radio (LMR) PTT communications over a broadband network. In accordance with some embodiments, communication device 100 may provide both PTT public safety talkgroup calls and individual public safety calls 124 and PTT non public safety calls, all audio applications being prioritized within the system to ensure that public safety applications are prioritized over non public safety applications.

Examples of the public safety audio applications 122 may comprise one or more of talkgroup and individual PTT calls 124, emergency calls 128, voice over internet protocol, (VoIP) 130, camera recording 132, remote listening 134, and video streaming 136. The audio applications are provided by the talkgroup and individual calls 124, the emergency calls 128, while the voice over internet protocol, (VoIP) 130, while the camera recording 132, ambient calls/remote listening 134, and video streaming 136. Public safety audio is prioritized over non public safety audio applications, such as public telephony 126. In accordance with the embodiments, the broadband public safety audio application 122 sets audio prioritizations for both PTT individual and group public safety calls and non public safety calls, and the audio manager stores the audio prioritizations.

The broadband PTT application 122 extends push-to-talk (PTT) communication by enabling the operating system (OS) 116, whether that OS comprises an Android operating system, or other OS, to instantly communicate with two-way radio and other devices within the broadband network. The application enabling broadband PTT 122 may comprise for example, WAVE technology application by Motorola Solutions Inc., which enables Land Mobile Radio (LMR) PTT group communication over a broadband network. With appropriate software applications and platforms, such as WAVE technology operating over an Android open source platform, communication devices, such as communication device 100, are now able to offer group communication functionality carried out over a broadband network. The broadband PTT application 122 provides a powerful PTT platform to enhance and optimize work group communications by connecting disparate networks such as radio, cellular, telephony, and/or Wi-Fi to name a few. Whether on a smartphone, radio, computer, landline or any other embodiment of communications device 100, working groups can connect instantly and securely using PTT 112 and the broadband PTT application 122.

The operating system 116 provides audio management of the plurality of audio applications 150 via an audio manager 120. In accordance with the embodiments, the OS 116 is provided via a public safety manager extension 120 to control the interface and prioritization of audio features, such as the microphone 104 and speaker 106, to the plurality of audio applications 150. The public safety manager extension 120 may be provided to device 100 via an application programming interface (API). In computer programming, an application programming interface (API) is a set of subroutine definitions, protocols, and tools for building application software. The communication device 100 further comprises a transmitter 138 and receiver 140 operatively coupled to the controller 114 for transmitting and receiving over the broadband frequency network. When device 100 is keyed up, via a press of the PTT 112, a user speaks into the device 100, the microphone 104 detects the audio signals and transfers the audio signals through the controller 114 for audio processing and appropriate conversions for being processed through the transmitter 138 where filtering, mixing and amplification take place for eventual transmission as a radio frequency (RF) signal. Radio frequency signals received and processed through the receiver 140 and controller 114 of communication device 100 may be output as text, images, video, and/or or audio. Signals output as audio are played out at speaker 106. For the purposes of this application, a controlled prioritization is provided for a plurality of audio applications. In accordance with the embodiments, third party applications are run at a default priority level using the operating system without dependency on the public safety manager extension.

In accordance with the embodiments, prioritization of an audio application is provided through a broadband PTT application 122 through interoperation of the audio manager 118 of the OS 116 with the public safety manager extension 120. In accordance with the embodiments, each audio application of the plurality of audio applications 150 is able to request the platform extension 120 in order to prioritize an audio request. In accordance with the embodiments, each audio application is configured with audio priorities for all call types or audio use cases which the application supports. For example, an ecosystem of LMR PTT audio applications and third party broadband applications can be formed, wherein all will have a priority, explicitly configured, or implicitly configured, for those third party apps not utilizing the platform extension for audio prioritization.

In accordance with the embodiments, the prioritization of the plurality of audio applications 150 is downloadable from an external server (not shown) that provides remote provisioning. No fragmentation is needed nor takes place. Reconfiguration of priority for the plurality of audio applications 150 can be changed via the device itself, without use of any external devices. For devices having emergency, the emergency mode is assigned first priority. Emergency is granted first priority, and then in accordance with an example embodiment secure VoIP 130, may be configured for next priority. In accordance with the embodiments, telephony calls are interrupted to permit prioritized LMR calls. The prioritization is advantageously provided through an open source platform extension, such as an Android platform extension, to enable applications, including telephony, to prioritize their audio. Applications are not required to use the extension, thus providing full compatibility with third party applications that have no need for audio priority. The platform extension can be advantageously applied without changing any user interface features. Prior to using audio resources per the standard operating system design, an application, such as the VoIP 130, may use the platform extension to prioritize an audio request. The VoIP application 130 may further be embodied as a secure VoIP 130 for some public safety applications.

Operationally, the communication device 100 is unmuted (microphone 104 open) during a telephony call. In response to an inbound talkgroup call being decoded by TG/individual Call application 124 running on controller 114, the telephony call continues, since the telephony call is configured with higher priority than regular talkgroup and or individual PTT calls. The microphone 104 is unmuted during a telephony call when an inbound emergency call is decoded by emergency application 128 running on controller 114, however the telephony call drops, and device 100 unmutes to the emergency call.

Since the priority is configurable, the embodiments allow standard third party applications to be used, with no notion of priority, and work transparently at a default priority level for those third party applications. The device 100 is able to take advantage of the fact that the operating system has no centralized server granting, controlling, or interrupting access to media resources. Thus, the audio applications are able utilize audio resources, such as microphone 104 and speaker 108, directly, without going through an interim media server.

In accordance with the embodiments, the applications inform one another of audio utilization through the audio manager. Applications can choose to ignore audio manager notifications. The audio manager 118 operating in accordance with the embodiments provides notifications based on priority without impacting the OS 116. The prioritization provided by the embodiments is configurable, and can thus be varied to accommodate a variety of different needs of different customers. The audio applications within device 100 may utilize different priorities based on call types or modes. For example, applications controlling call types such as PTT Talkgroup, PTT Individual may be prioritized differently. Applications which control device modes, such as emergency may be prioritized.

All prioritized application requests are queued and will resume based on application priority, not just the most recent priority. The audio prioritization of the embodiments is capable of handling multiple outstanding audio focus requests. When an application terminates audio, the audio manager determines the application with the next highest priority and notifies that application that the application's audio may now resume. The application itself is thus able to decide whether to resume audio or not. The audio streams managed through device 100 are not modified or routed differently, but rather device 100 provides a means for a high priority audio stream to be played. The embodiments prioritize application audio within a device and are not dependent on communications from other devices. The existing operating system audio manager, such as the Android audio manager, can be used to manage audio resources without the need for an additional resource manager. The public safety extension manager is an API that specifies priority for a call and configures the audio manager for improved decision making.

Figure 2:
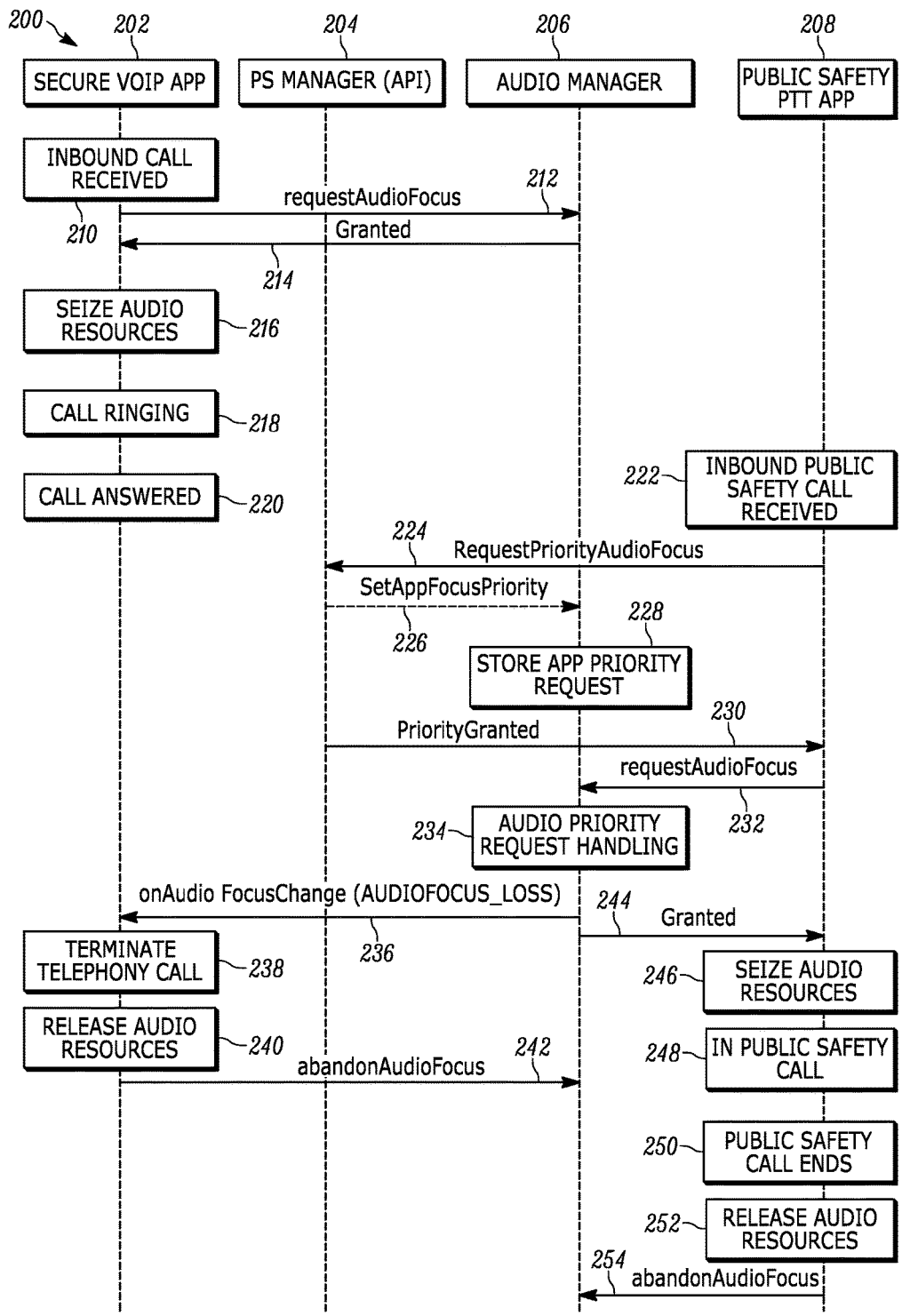
FIG. 2 is sequence diagram formed and operating in accordance with some embodiments.

FIG. 2 is sequence diagram 200 formed and operating in accordance with some embodiments. Sequence 200 shows operational sequencing and audio management prioritization taking place amongst a Secure VoIP application (APP) 202, a public safety manager 204, in the form of an application platform interface (API), an audio manager 206 and a Public Safety PTT App 208. The sequence 200 is shown and described to explain how incoming PTT application calls can be prioritized over Secure VoIP calls.

Secure VoIP application 202 detects an inbound call at 210 and sends a message at 212 to the audio manager 206 requesting audio focus. Step 212 provides for requesting audio focus and registering of a listener for audio focus loss events from the audio manager. In response to the request 212, the audio manager 206 either grants the request, or denies and queues the request at 214. If granted 214, then the Secure VoIP App 202 is allowed to seize audio resources 216 and generate ring tones 218, so that the call can be answered at 220.

The Public Safety PTT application 208 decodes an inbound public safety call at 222 and sends a message to the public safety manager 204 requesting priority at 224. The request for priority 224 may take place earlier or immediately before a call is received with a different priority. The public safety manager 204 notifies at 226 the audio manager 206 to set, register, or store at 228 the PTT Client app 208 with its requested priority 224. The public safety manager 208 returns status of the priority request to the Public Safety App 208 at 230. The Public Safety PTT App 208 can then request audio focus at 232 for its call priority request.

The audio manager 206, in response to determining that the call is a high priority Public Safety PTT call, engages the call priority request handling at 234 which triggers a change of audio focus message at 236 to the Secure VoIP application 202 indicating that the call audio will terminate. This indication instructs, the Secure VoIP App drops the call, but may chose to place the call on hold, or re-direct call to voice mail so that audio resources at 240 may be released. Although Secure VoIP App 202 released audio resources at 240, its request for audio at 212 remains queued by the Audio Manager 206 until Secure VoIP app decides to abandon audio focus at 242. This directs the audio manager 206 to release its queued request for audio focus at 242.

On receiving audio focus at 244, Public Safety PTT App 208 obtains the audio resources 246, enables microphone and/or speaker 248, and enters into the Public Safety PTT call at 248. The Public Safety PTT call continues until 250, when it finally drops at 250. At this point, the Public Safety PTT app 208 releases its audio resources at 252 and informs the Audio Manager 206 that it is abandoning audio resources at 254. This instructs the Audio Manager 206 to remove the Public Safety PTT App's request for audio focus at 232 from its queue.

Messaging sequence 200 illustrates how priorities are assigned intra-device without an additional resource manager, without any external devices setting a priority flag. The system 200 allows applications to request their own configurable priority without modifying audio streams. The embodiments allow for a plurality of priority levels amongst applications to be prioritized. Unlike systems that might combine priority streams, the embodiments allow applications to request their own configurable priority and to do so without modifying the audio streams.

Figure 3:
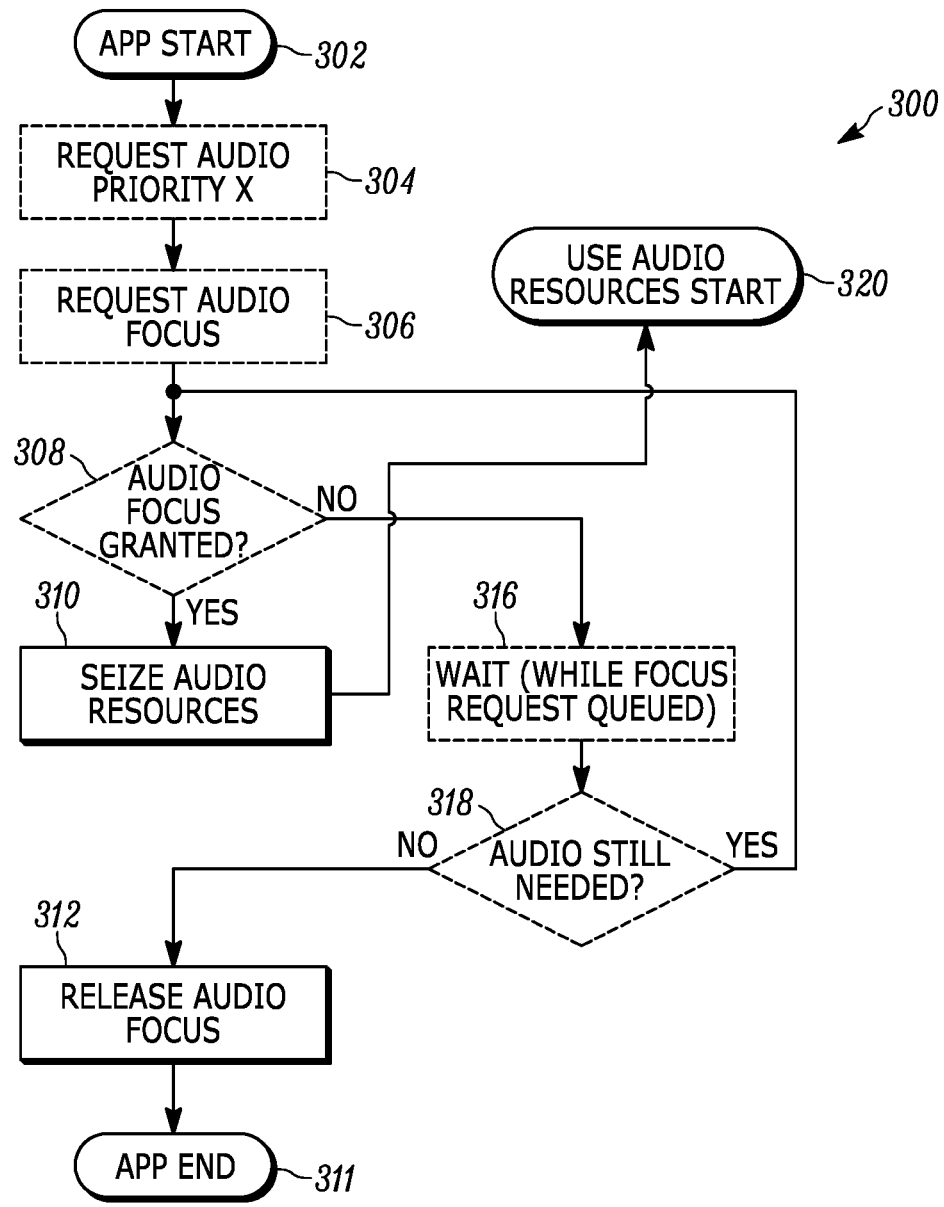
FIG. 3 is a flowchart of a method of audio prioritization from the audio application side in accordance with some embodiments.

FIG. 3 is a flowchart of a method 300 of operating the communication device of FIG. 1 from the audio application side in accordance with some embodiments. In accordance with the embodiments, method 300 begins at 302 by starting an audio application that requests audio priority for a call type at 304 with a request for audio focus at 306. The determination to grant audio focus is made at 308 by an audio manager of the device.

If the audio focus is granted at 308, then the audio application uses the audio resources at 310 and moves over to use audio resource usage and start the call at 320.

In accordance with the embodiments, if the audio focus is not granted at 308, then the audio focus request is queued at 316. A determination is then made at 318 as to whether the audio associated with the queued focus request is still needed (i.e. was the call hung up or put on hold). If the audio is no longer needed at 318, for example the call was hung up, then the audio resources are released at 312 and the audio application ends at 314. If the audio is determined to be needed at 318, for example the call was put on hold, then the method returns to 308 to check for an audio focus grant.

When the audio focus is granted at 308 (whether from a hold situation or immediate), then the audio application seizes the audio resources at 310 and the application starts using the audio resources at 320 by processing the audio through the microphone and speaker as appropriate. Audio is processed through the microphone and speaker of the device at 322 while audio focus is monitored for loss at 324.

Figure 4:
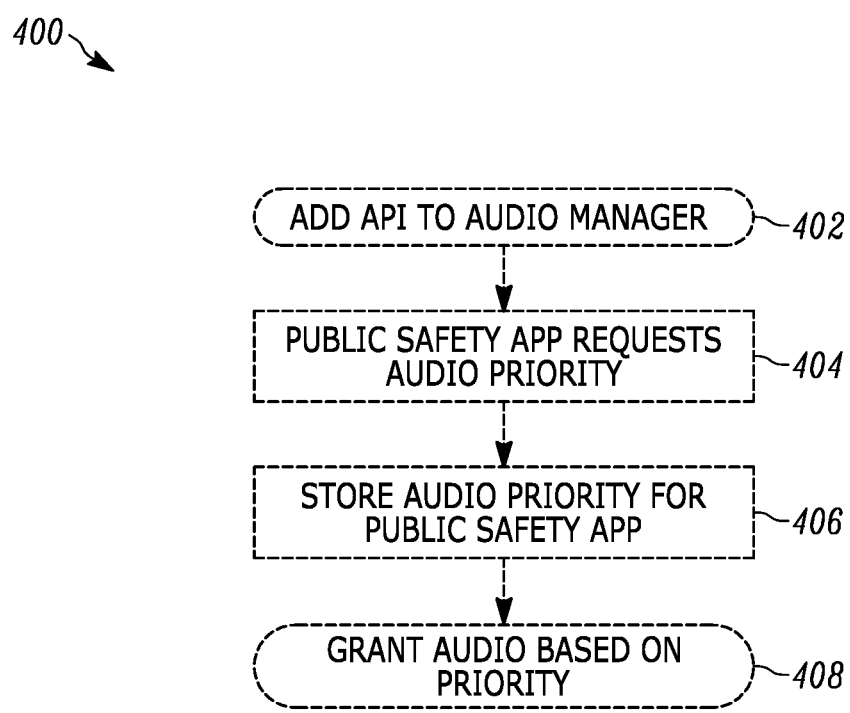
FIG. 4 is a flowchart of a method for granting audio requests in a communication device in accordance with the embodiments.

FIG. 4 is a flowchart of a method for granting audio requests in a communication device in accordance with the embodiments. The method begins by adding an application programming interface (API) to a communication device for interfacing with the audio manager and public safety audio application. The device is now enabled to accept requests for audio priority, from a public safety audio application, to the API. The public safety audio applications already have audio priority levels previously configured by a central server or user. In response to the public safety application requesting audio priority at 404, the audio manager stores audio priority of the public safety application at 406. Granting of audio, by the audio manager, can then be made based on priority at 408.

Figure 5:
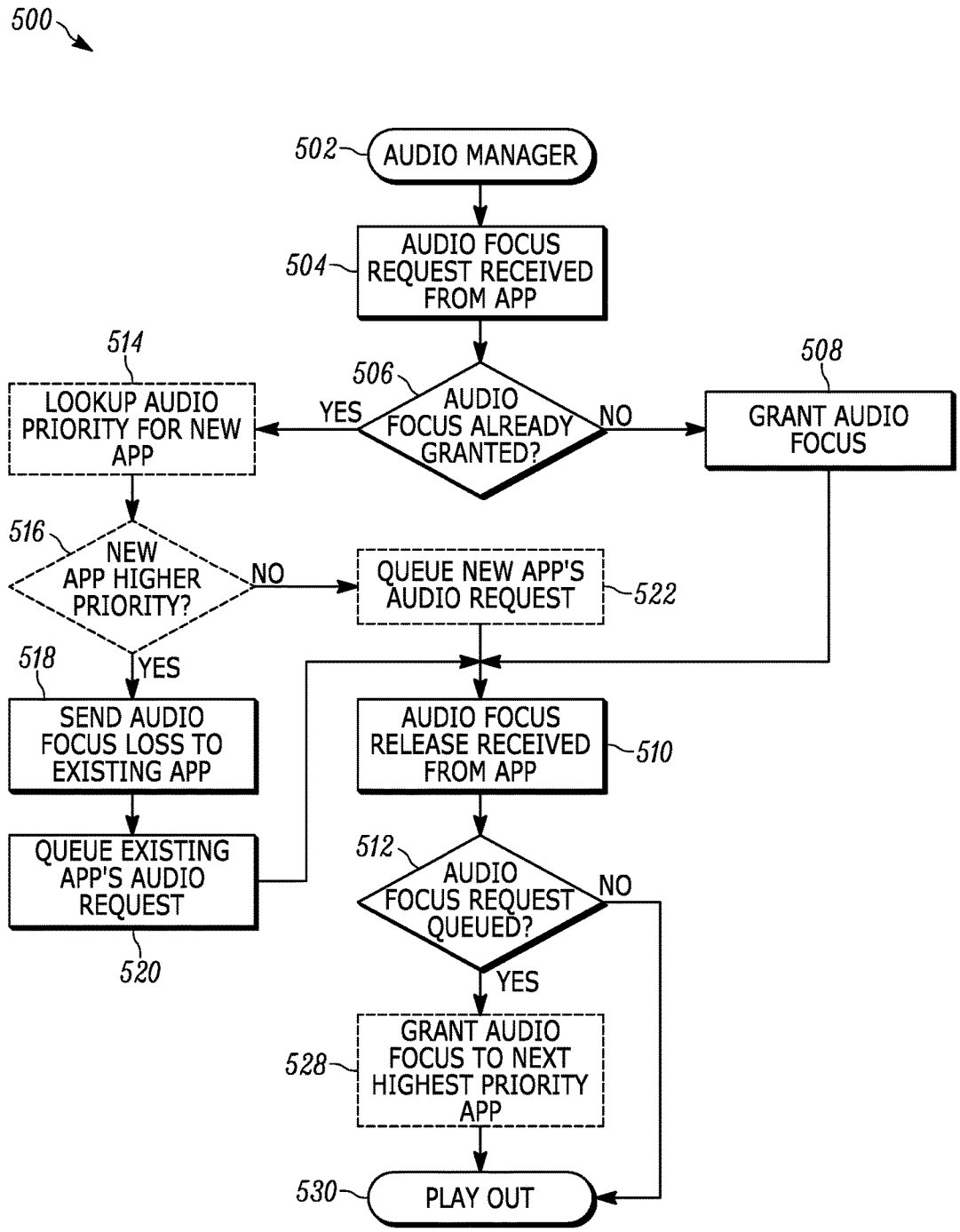
FIG. 5 is a flowchart of a method of audio prioritization from the audio manager side in accordance with some embodiments.

FIG. 5 is a flowchart of a method 500 from the audio manager side in accordance with some embodiments. The method 500 begins by audio manager 502 receiving an audio focus request from an audio application at 504.

If the audio focus not been granted, as determined at 506, then the audio manager 502 grants audio focus and proceeds to lay out audio at 530 while continuing to monitor for incoming audio focus requests. If the audio focus has already been granted, as determined at 506, then in accordance with the embodiments, the audio manager 502 inspects the priority of the new application with that of the application currently holding audio focus. In accordance with some embodiments, the priorities of the plurality of audio applications may be predetermined priorities selected by a user. Hence, application priorities of the plurality of audio applications may be escalated in accordance with predetermined priorities selected by a user and/or the plurality of audio applications may be configured and provisioned by a centralized server.

If the new requesting audio application has higher priority, then the audio manager 502 escalates that new request and grants audio focus to the requesting application at 518, notifies the application currently holding audio focus that it no longer has audio focus at 520, and queues the interrupted application's request for audio focus at 522. The method then proceeds to 510 when the application currently holding audio focus finally releases it. If one or more audio focus requests have been queued as determined at 512, then audio manager 502 grants audio focus to the next highest priority application at 528. On receiving audio focus, application can resume its audio at 530.

Accordingly, there has been provided a communication device and method that provides broadband and narrowband functionality with a method for prioritizing audio applications for services for first responders operating in a broadband network. PTT public safety audio as well as emergency can be prioritized along with other non-LMR audio applications. The approach to prioritize PTT operation allows mission-critical performance to be incorporated seamlessly into a broadband smartphone or tablet type device. Third party applications are run at a default priority level using the operating system without dependency on the public safety manager extension. Thus, the device and method facilitate communication and collaboration over broadband while allowing public safety customers the flexibility of choice when it comes to adding broadband software and services. The combination of both narrowband public safety and broadband provided by the embodiments thus provides an advantageous edge to public safety by creating a seamless communications experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile communication device, comprising:
   a controller having an operating system (OS) providing an open source platform and audio manager;
   an application programming interface (API) providing public safety management to the audio manager for prioritizing public safety audio applications; and
   a plurality of public safety audio applications, each public safety audio application sending a request to the API requesting priority, the API setting the priority of the plurality of public safety audio applications based on predetermined priorities associated with each of the plurality of public safety audio applications, the API notifying the audio manager to store each of the priorities associated with the plurality of public safety application, the audio manager granting priority to an application based on the stored priority.

2. The mobile communication device of claim 1, and wherein the API sets the audio prioritizations for public safety calls over non-public safety calls.

3. The mobile communication device of claim 1, wherein the plurality of public safety audio applications comprise:
   PTT individual public safety calls;
   PTT group public safety calls; and
   non-PTT public safety calls.

4. The mobile communication device of claim 3, wherein the controller, via the audio manager, queues requests for audio that cannot be granted.

5. The mobile communication device of claim 3, wherein the mobile communication device provides Land Mobile Radio (LMR) PTT communications over a broadband network.

6. The mobile communication device of claim 1, wherein call requests of the plurality of audio applications are escalated in accordance with predetermined priorities selected by a user.

7. The mobile communication device of claim 1, wherein call requests of the plurality of audio applications are configured and provisioned by a centralized server.

8. The mobile communication device of claim 1, wherein the operating system is an Android operating system.

9. The mobile communication device of claim 1, wherein the mobile communication device operates over a broadband network.

10. A method for granting audio priority requests in a mobile communication device, comprising:
    adding a public safety (PS) application programming interface (API) to the mobile communication device;
    requesting audio priority from the public safety API for a public safety audio application of the mobile communication device, the public safety audio application having audio priority previously configured by a central server;
    storing the predetermined audio priority for the public safety application within an audio manager of the mobile communication device in response to the request for audio priority by the public safety API; and
    granting audio, by the audio manager of the mobile communication device, based on the predetermined audio priority of the public safety audio application.

11. The method of claim 10, wherein the prioritized public safety audio applications comprise both public safety PTT calls and public safety non-PTT calls operating over broadband.

12. The method of claim 10, further comprising:
    queuing lower priority public safety audio requests while granting a highest priority public safety audio request for both the public safety PTT calls operating over broadband and the public safety non-PTT calls operating over broadband.

* * * * *